United States Patent [19]

Rowland et al.

[11] Patent Number: 4,908,986
[45] Date of Patent: Mar. 20, 1990

[54] PLANT FERTILIZING AND WATERING DEVICE

[75] Inventors: Robert G. Rowland, Cedarburg; Richard C. Olson, Bristol, both of Wis.

[73] Assignee: Garden Hardy, Inc., Bristol, Wis.

[21] Appl. No.: 322,102

[22] Filed: Mar. 13, 1989

[51] Int. Cl.$^4$ ............................................. A016 27/00
[52] U.S. Cl. ............................................. 47/80; 47/64
[58] Field of Search ........................... 47/64, 80, 98.5

[56] References Cited

U.S. PATENT DOCUMENTS 2,135,998  11/1938  Beyer ........................................ 47/80
3,769,748  11/1973  Goldring ................................... 47/80
4,040,207   8/1977  Lancaster .................................. 47/80

FOREIGN PATENT DOCUMENTS 637264  7/1983  Switzerland ........................... 47/80

Primary Examiner—Henry E. Raduazo
Assistant Examiner—Jerrold D. Johnson
Attorney, Agent, or Firm—Fuller, Puerner & Hohenfeldt

[57] ABSTRACT

A disk composed of rigid open cell synthetic resin foam has a recess in one face for being occupied by fertilizer. A water permeable plug of similar foam is inserted in the recess to retain the fertilizer and to serve as a wick for conducting fertilizer dissolved in water out of the recess and into the bottom hole of a plant pot standing on the disk for the fertilizer to permeate the soil in the pot. The fertilizer is preferably composed of pellets coated with water permeable resin. In use the disk is set in a reservoir and covered with water.

1 Claim, 1 Drawing Sheet

U.S. Patent  Mar. 20, 1990  4,908,986
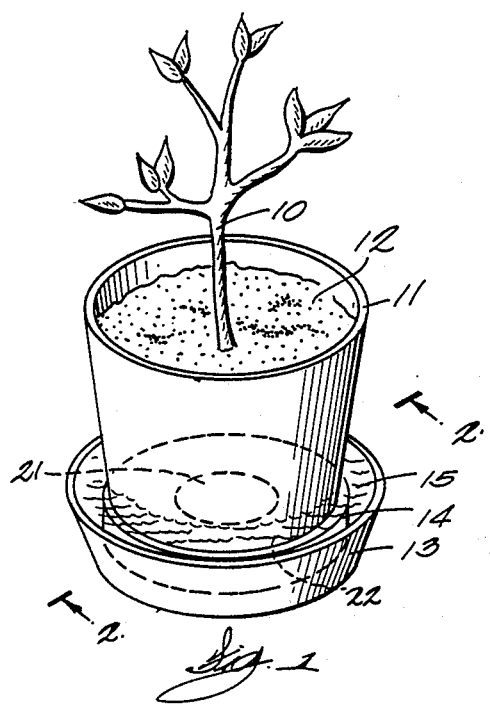
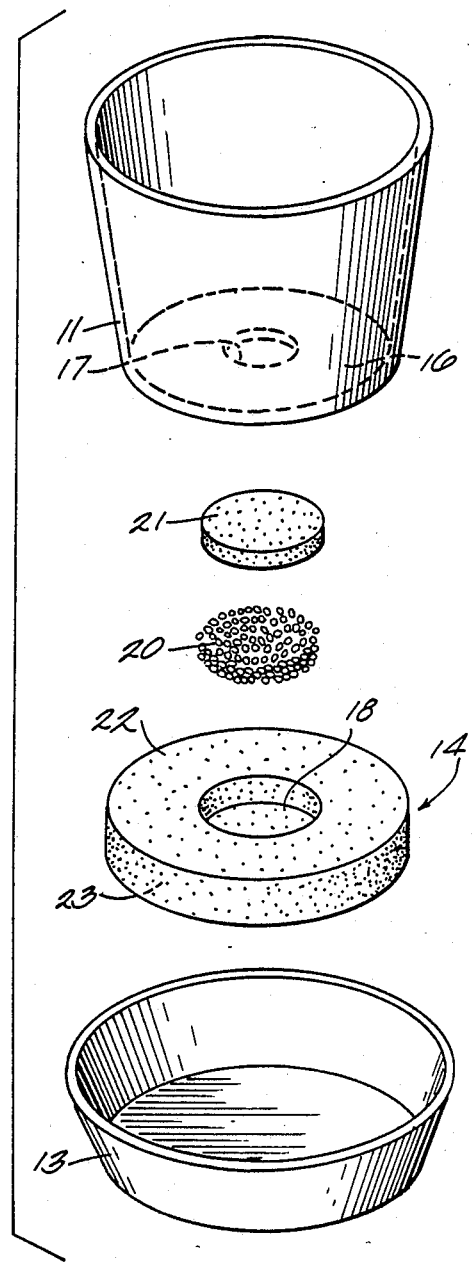
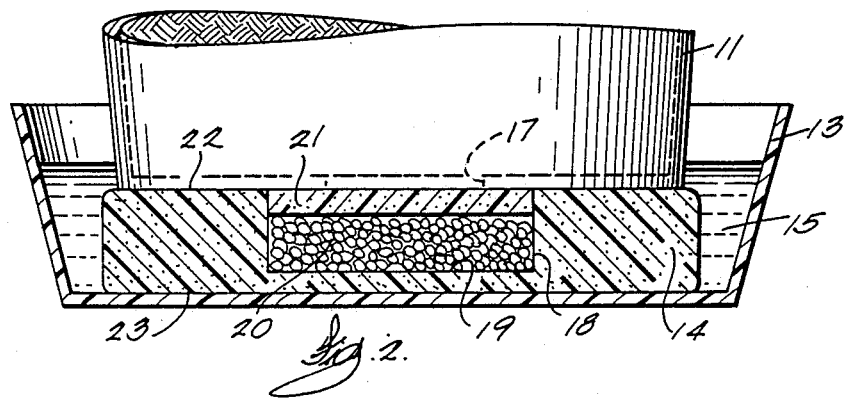

PLANT FERTILIZING AND WATERING DEVICE

BACKGROUND OF THE INVENTION

The invention disclosed herein is a device for achieving controlled watering and fertilizing of plants, especially potted plants. Most persons who own potted house plants have no way of gaging the proper rate of fertilizing and watering them. Hence, it is not uncommon for plants tended by other than professional florists to exhibit poor flowering, growth and color and shriveled and unhealthy leaves. Death of a costly plant is often the consequence of over or under watering and fertilizing.

There is a commercially available device which is used in conjunction with potted plants and is intended to provide regulated feeding and watering. This device comprises a soft felt ring having a hole through its center. In a commercially available model the ring has a diameter of about 8.5 cm, a thickness of about 2 cm and a hole of about 3.5 cm. The ring is deposited in a leakproof pan or reservoir in which the potted plant is normally placed. A water impervious plastic cup containing fertilizer is placed in the hole inverted, that is, with its plastic bottom up and its top down. What is normally the top opening of the cup has a thin porous disk of non-woven material glued onto it so the enclosed grains of fertilizer do not spill out when the cup is inverted and so water can enter the cup and dissolved fertilizer can issue from it. There is a pin hole in the upwardly presented bottom of the plastic cup to relieve entrapped air so water can rise into the fertilizer through the porous disk. The felt disk is covered with water and must be kept covered for the life of the fertilizing device. The pot containing the plant is placed on the felt ring with the expectation that the roots of the plant will tend to grow toward the source of the dissolved fertilizer which is supposed to diffuse into the soil through the hole in the bottom of the pot.

The known device has some disadvantages. The felt ring is not as durable as one would desire in the chemical fertilizer environment. The flow path of the fertilizer solution out of the cup to the bottom of the plant pot is devious and opposed to the path that fresh water flows into the cup. Because the inverted cup is impermeable plastic, the fertilizer solution must migrate radially outwardly along the bottom of the felt ring and into and up and around the ring into the water around the ring to get to the bottom of the pot. The felt is a poor conductor of liquid by capillarity which must be relied on to get the fertilizer solution to the bottom of the plant at the desired rate. The felt, which must have low density and low rigidity to be saturable, becomes soft and does not support the pot in a completely stable manner. The arrangement is such that apparently the felt itself could absorb and hold a substantial percentage of the fertilizer. The pin hole can become plugged. If it plugs by calcification or other cause and the water depletes, the next time water is added an air trap might be created in the cup which could inhibit outflow of fertilizer.

SUMMARY OF THE INVENTION

The new plant watering and fertilizing device described herein overcomes the above mentioned disadvantages in that, as far as a user is concerned, it is comprised simply of an integral synthetic resin disk which only needs to be placed in the pot reservoir and covered with water after which the pot containing the plant is set on it and watered periodically.

Briefly stated, the new plant watering and fertilizing device comprises a disk of rigid synthetic resin or polymer open cell foam. A recess is formed in the central region of the disk by pressing it with a suitable die such that the foam compacts and provides a closed bottom for the recess. A fertilizer in the form of pellets or prills having modulated release characteristics is deposited in the recess, partially filling it. A plug which is also composed of rigid open cell foam is inserted in the recess to retain the fertilizer pellets and for serving as a capillary or wicking element for making the fertilizer available to the plant. The design is such that use of adhesives is completely avoided in the manufacture of the product. The foam disk is set in a waterproof dish and covered with water up to its top surface. The plant pot is placed on the disk. Fresh water permeates the disk radially and axially inwardly to the fertilizer containing recess. Fertilizer solution takes a direct path to the hole in the bottom of the pot by simply leaving the recess by capillarity or wicking action through the porous open-celled foam plug. The hole in the pot is directly over the plug.

A more detailed description of the new watering and fertilizing device will now be set forth in reference to the accompanying drawing.

DESCRIPTION OF THE DRAWING

FIG. 1 is a perspective view of a potted plant supported on one of the new fertilizing and watering disks which has been deposited in a dish;

FIG. 2 is a partial vertical section taken on a line corresponding to 2—2 in FIG. 1; and FIG. 3 is an exploded view, starting at the bottom of the sequence, of a leak proof reservoir, the new open celled recessed foam disk, a quantity of fertilizer pellets, an open celled foam capillary or wicking plug, and an empty plant pot.

DESCRIPTION OF A PREFERRED EMBODIMENT

FIG. 1 illustrates a plant 10 in a pot 11 containing soil 12. The pot is standing in a reservoir 13 on the new watering and fertilizing disk which is generally designated by the reference numeral 14. The term "disk" as used herein is intended to be generic to variously shaped items such as triangles or other polygons even though only a circular disk 14 is illustrated. A quantity of water 15 up to the level of the disk is contained in reservoir 13. The empty pot 11 is depicted in FIG. 3. Its bottom 16 has a central hole 17. In conventional plant care, hole 17 would be used to drain off excess water that is poured on to the top of the soil 12 in which the plant is rooted. When the new watering and fertilizing device described herein is used with the pot, bottom hole 17 serves as a passageway for flow of fertilizer dissolved in water to the bottom of the soil in the pot so the roots of the plant tend to grow toward the hole and, hence, toward the source of fertilizer and water.

FIG. 2 shows the new fertilizing and watering disk 14 in section. The disk has a nominally top side 22 and a nominally bottom side 23. The disk contains a recess 18 having a closed bottom wall 19. The disk is composed of a rigid open cell synthetic resin foam. The recess 18 is formed by pressing the top side 22 of the foam disk 14 with a cylindrical die, not shown. Compression of the foam results in the bottom wall 19 of the disk becoming less porous than other regions in the disk in which case diffusion of fertilizer out of the bottom of the recess is inhibited which is desirable. A foam, characterized as a floral foam, for general purpose use such as holding the stems of flower in a floral arrangement, has been used successfully for the disk. A phenolic foam is considered a preferable material. This foam is available from Smithers-Oasis Company, located in Kent, Ohio. Recess 18 is partially filled with a quantity of fertilizer prills or pellets 20. The pellets used are known by the registered trademark "OSMOCOTE" and are available from Sierra Chemical Company, doing business at Milpitas, Calif. By way of example and not limitation, the grade of pellets having a diameter of roughly 3 to 4 mm have been found to be satisfactory. These fertilizer pellets are characterized by their controlled release properties. They are composed of individual quantities of balanced plant nutrients enclosed within a resin coating which is permeable to water that dissolves the nutrients. When wet the dissolved nutrients gradually diffuse through the encapsulated fertilizer into the surroundings. The rate of diffusion depends on, among other things, soil and water temperature. Hence, as an example, if a sun-loving plant is located where it gets a lot of sunlight, the temperature of the plant, the soil and the fertilizer will be relatively high most of the time which will tend to bring about rapid plant growth. This means that the plant's demand for fertilizer and water is greater than it is when the plant is in a less favorable sun and temperature location. Fortunately, the permeability of the resin coating to inflow of water and outflow of fertilizer solution is substantially directly proportional to temperature in which case the feeding of the plant is properly modulated for existing temperature.

The quantity of fertilizer pellets 20 depicted in FIGS. 2 and 3 is enclosed by a plug serving as a capillarity or wicking element 21. Plug 21 is preferably comprised of the same rigid foam material as is the body of the disk 14. Because of the difference in osmotic pressure between the inside fertilizer containing recess 18 and the soil in the pot 11 which is interfacing with the plug 21 through bottom hole 17 of pot 11, water which has picked up fertilizer from the pellets 20 flows by capillarity or wicking action out of recess 18 through porous plug 21 and directly to the soil by conduction through hole 17 in the pot. Thus fertilizer laden water permeates upwardly into the soil so the plant roots tend to grow toward the source of fertilizer where it is most concentrated in which case the root system is most advantageously caused to grow deeply and widely for absorbing the nutrients that result in maintenance of a healthy plant.

In most cases, the nutrients are expected to last for at least six months. The only requirement on the part of the plant owner is to keep the water level in the reservoir just about even or slightly higher than the top surface of the disk 14. This negates the possibility of over watering or under watering which is a common mistake when top watering and fertilizing is practiced.

It will be noted by the user that the rigid foam disk is not at all flexible and, hence, that it supports the pot in a very stable and solid manner. When the fertilizer is expended, the disk is simply replaced and watered again. It is highly advantageous that users need not be concerned about inserting fertilizer nor having the fertilizer spill out since the porous plug 21 makes a high friction fit against the wall of recess 18 whether the disk is dry or wet.

Besides promoting deeper rooting and properly regulated fertilizing of plants, the new device prevents root rot through its wicking action because the plant will take only the water it needs. No judgment on the part of the user is required as in cases where fertilizers must be mixed or the quantity must be estimated in which case the new device provides the exact amount of nutrients each time the plant is watered. A generally appreciated advantage is that use of the new disk can avoid the spills and overflows caused by filling the plant pot from the top in a conventional manner.

Although an illustrated embodiment of the invention has been described in detail, such description is tended to be illustrative rather than limiting, for the invention may be variously embodied and is to be limited only by interpretation of the claims which follow.

We claim:

1. A device for introducing water and fertilizer to the soil of a potted plant when the pot is set thereon and the device is wetted with water, said device comprising:

a disk composed of open cell synthetic resin foam having opposite sides in one of which sides there is a recess having an underlying bottom wall of said foam for containing a quantity of fertilizer, the recess having been formed by pressing said disk on said one side a sufficient distance into said disk to compress said foam composing said bottom wall and collapse the cells of the foam so the porosity of said foam in the bottom wall is substantially lower than the porosity of other regions of the disk, and a liquid permeable plug composed of open cell synthetic resin foam for being inserted into said recess to retain said fertilizer and to serve as a wick for conducting fertilizer dissolved in water from the recess.

* * * * *